US012594815B2

(12) United States Patent
Iwama

(10) Patent No.: US 12,594,815 B2
(45) Date of Patent: Apr. 7, 2026

(54) TEMPERATURE CONTROL SYSTEM

(71) Applicant: HONDA MOTOR CO., LTD., Tokyo (JP)

(72) Inventor: Keizo Iwama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 127 days.

(21) Appl. No.: 18/434,882

(22) Filed: Feb. 7, 2024

(65) Prior Publication Data

US 2024/0262167 A1 Aug. 8, 2024

(30) Foreign Application Priority Data

Feb. 8, 2023 (JP) ................................. 2023-017644

(51) Int. Cl.
B60H 1/00 (2006.01)
(52) U.S. Cl.
CPC .................... B60H 1/00921 (2013.01); *B60H 2001/00928* (2013.01)
(58) Field of Classification Search
CPC ......................... B60H 1/00921; B60H 1/00928
USPC ......................................................... 165/202
See application file for complete search history.

(56) References Cited

U.S. PATENT DOCUMENTS

| | | | |
|---|---|---|---|
| 2021/0053412 A1 | 2/2021 | Kim et al. | |
| 2022/0063368 A1 | 3/2022 | Miyamoto et al. | |

FOREIGN PATENT DOCUMENTS

| | | | | |
|---|---|---|---|---|
| CN | 112046237 A | * | 12/2020 | |
| CN | 212289437 U | * | 1/2021 | |
| JP | 2021-031045 A | | 3/2021 | |
| WO | WO 2020/129257 A1 | | 6/2020 | |

OTHER PUBLICATIONS

May 21, 2024, Translation of Japanese Office Action issued for related JP Application No. 2023-017644.

* cited by examiner

*Primary Examiner* — Davis D Hwu
(74) *Attorney, Agent, or Firm* — Paratus Law Group, PLLC

(57) ABSTRACT

A temperature control system is mounted on a vehicle. The temperature control system includes a PU cooling circuit configured to allow a first refrigerant to flow therethrough and adjust a temperature of a power unit, a refrigeration cycle circuit, which is used for air conditioning, configured to allow a second refrigerant to flow therethrough, a first heat exchanger configured to exchange heat between the first refrigerant in the PU cooling circuit and the second refrigerant in the refrigeration cycle circuit, a gas-liquid separation device configured to separate the first refrigerant into gas and liquid, and a refrigerant cooling circuit configured to allow the first refrigerant to flow therethrough and communicate with the PU cooling circuit via the gas-liquid separation device.

5 Claims, 12 Drawing Sheets

A/C: HEATING/BAT: APPROPRIATE TEMPERATURE

A/C: COOLING/BAT: APPROPRIATE TEMPERATURE

A/C: COOLING/BAT: WARMED UP

TEMPERATURE CONTROL SYSTEM

CROSS-REFERENCE TO RELATED APPLICATIONS

This application is based on and claims priority under 35 USC 119 from Japanese Patent Application No. 2023-017644 filed on Feb. 8, 2023, the entire content of which is incorporated herein by reference.

TECHNICAL FIELD

The present disclosure relates to a temperature control system mounted on a vehicle.

BACKGROUND ART

In recent years, efforts to realize a low-carbon society or a decarbonized society become active, and research and development on electrification technology are conducted to reduce $CO_2$ emission and improve energy efficiency in vehicles.

An electric vehicle is equipped with a power unit such as a motor as a drive source, a battery that supplies power to the motor, and an inverter that converts power from the battery and supplies the converted power to the motor. Since the power unit is a heat generating component, it is necessary to adjust a temperature by appropriately performing cooling or heating. On the other hand, in order to improve comfort in a vehicle interior, it is necessary to appropriately perform heating or cooling.

Therefore, a temperature control circuit has been proposed in which an electric vehicle is provided with a power unit cooling circuit that controls a temperature of a power unit in addition to a refrigeration cycle circuit for air conditioning, and a refrigerant in the refrigeration cycle circuit and a refrigerant in the power unit cooling circuit are configured to be able to exchange heat by a chiller (for example, WO2020/129257).

However, heat pump control in the refrigeration cycle circuit has a problem that a heating capacity decreases when an outside air temperature is low. In the temperature control circuit, it is desired to achieve both temperature control performance of the power unit and air conditioning performance while reducing an increase in power consumption regardless of an environmental temperature.

SUMMARY OF INVENTION

The present disclosure provides a temperature control system capable of achieving both temperature control performance of a power unit and air conditioning performance while reducing an increase in power consumption.

An aspect of the present disclosure relates to a temperature control system mounted on a vehicle, the temperature control system including:

a PU cooling circuit configured to allow a first refrigerant to flow therethrough and adjust a temperature of a power unit;

a refrigeration cycle circuit, which is used for air conditioning, configured to allow a second refrigerant to flow therethrough;

a first heat exchanger configured to exchange heat between the first refrigerant in the PU cooling circuit and the second refrigerant in the refrigeration cycle circuit;

a gas-liquid separation device configured to separate the first refrigerant into gas and liquid; and a refrigerant cooling circuit configured to allow the first refrigerant to flow therethrough and communicate with the PU cooling circuit via the gas-liquid separation device.

According to the present disclosure, it is possible to achieve both temperature control performance of a power unit and air conditioning performance while reducing an increase in power consumption.

BRIEF DESCRIPTION OF DRAWINGS

Exemplary embodiment(s) of the present invention will be described in detail based on the following figures, wherein.

DESCRIPTION OF EMBODIMENTS

Hereinafter, an embodiment of a temperature control system according to the present disclosure will be described with reference to the accompanying drawings.

Figure 1:
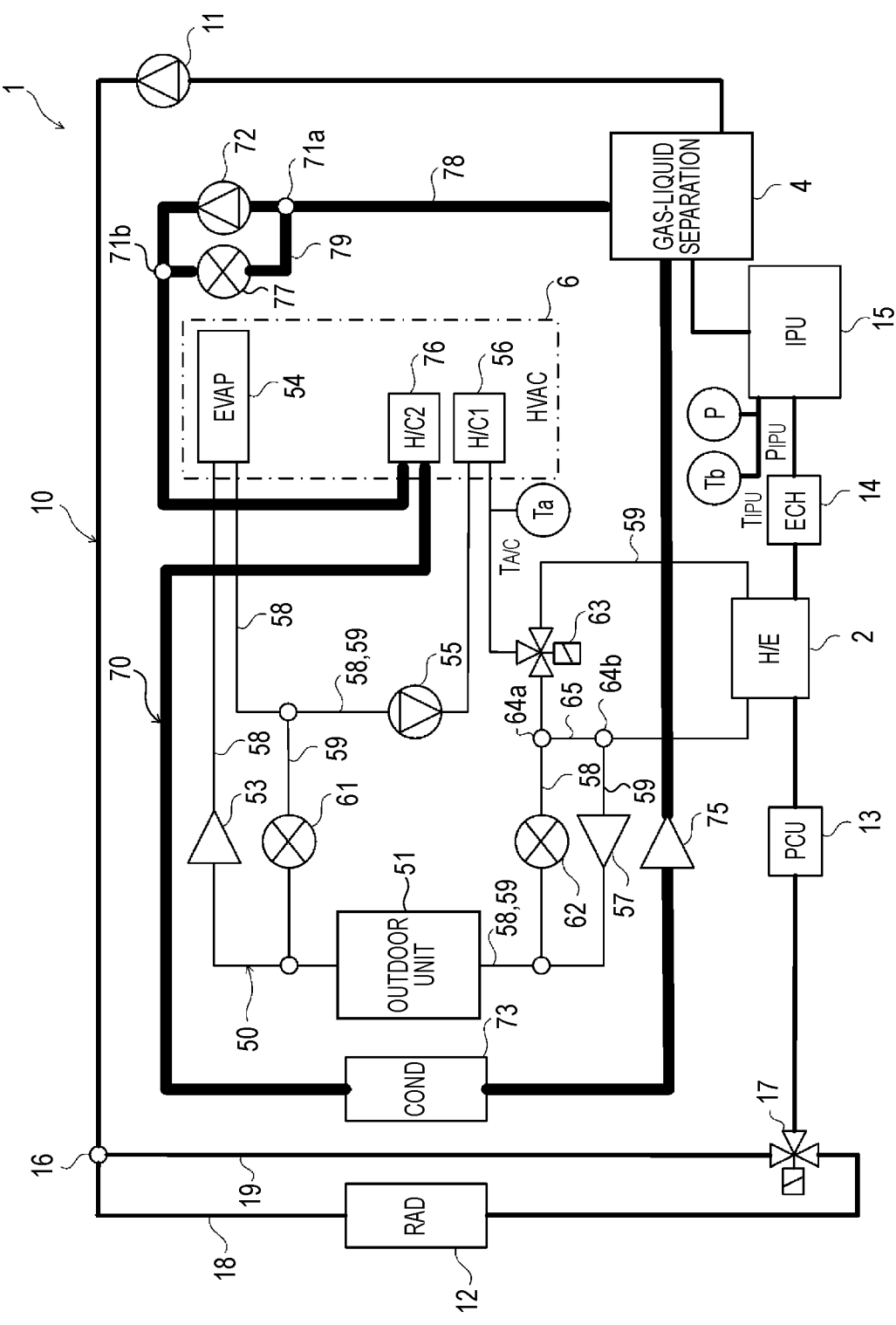
FIG. 1 is a circuit diagram of a temperature control system 1 according to an embodiment of the present disclosure.

A configuration of a temperature control system 1 according to the present embodiment will be described. FIG. 1 is a circuit diagram of the temperature control system 1 mounted on a vehicle.

As shown in FIG. 1, the temperature control system 1 includes a power unit (PU) cooling circuit 10 through which a first refrigerant flows and that cools a battery 15 (IPU), a heating, ventilation, and air conditioning (HVAC) 6, an A/C circuit 50 (refrigeration cycle circuit) through which a second refrigerant flows and that is used for the HVAC 6, a chiller 2 (H/E) that is capable of exchanging heat between the first refrigerant flowing through the PU cooling circuit 10 and the second refrigerant flowing through the A/C circuit 50, a gas-liquid separation device 4 that separates the first refrigerant into gas and liquid, and a refrigerant cooling circuit 70 through which the first refrigerant flows and that communicates with the PU cooling circuit 10 via the gas-liquid separation device 4.

The HVAC 6 is a car air conditioner unit that adjusts a temperature and a volume of wind in order to keep a vehicle interior comfortable, and includes an evaporator 54 and a first heater core 56 (H/C1) of the A/C circuit 50 and a second heater core 76 of the refrigerant cooling circuit 70. During cooling, cold air is supplied into the vehicle interior by wind passing through the evaporator 54, and during heating, warm air is supplied into the vehicle interior by wind passing through the first heater core 56 and/or the second heater core 76.

The battery 15, the gas-liquid separation device 4, a PU cooling circuit pump 11, a radiator 12, a PU cooling circuit 17, a PCU 13, the chiller 2, and an ECH 14 are arranged in this order in a main flow path 18 of the PU cooling circuit 10. The battery 15 is a rechargeable storage battery, and is, for example, a lithium ion battery. An electrolyte may be liquid or solid. The PU cooling circuit 11 is an electric pump. The PCU 13 is a heat generating component including a motor as a drive source, an inverter that converts power from the battery 15 and supplies the converted power to the motor, an onboard charger (OBC), and the like. The ECH 14 is a water heater. The chiller 2 is a heat exchanger. In the PU cooling circuit 10, a bypass flow path 19 connecting the PU cooling circuit 17 and a branching portion 16 located between the PU cooling circuit 11 and the radiator 12 is provided so as to bypass the radiator 12.

The PU cooling circuit 17 is a three-way valve, and is switchable between a RAD bypass OFF state and a RAD bypass ON state. In the RAD bypass OFF state of the PU cooling circuit 17, the first refrigerant flows to the battery 15, the gas-liquid separation device 4, the PU cooling circuit 11, the radiator 12, the PU cooling circuit 17, the PCU 13, the chiller 2, and the ECH 14. In the radiator 12, heat exchange is performed between the first refrigerant flowing through the PU cooling circuit 10 and the atmosphere.

On the other hand, when the PU cooling circuit 17 is brought into the RAD bypass ON state, the first refrigerant bypasses the radiator 12 and flows to the battery 15, the gas-liquid separation device 4, the PU cooling circuit 11, the bypass flow path 19, the PU cooling circuit 17, the PCU 13, the chiller 2, and the ECH 14. At this time, since the first refrigerant does not flow through the radiator 12, the first refrigerant does not exchange heat with the atmosphere in the radiator 12.

In a main flow path 78 of the refrigerant cooling circuit 70, the gas-liquid separation device 4, a refrigerant cooling circuit 72, the second heater core 76 (H/C2), a condenser 73, and a third expansion valve 75 are arranged in this order. The refrigerant cooling circuit 72 is a compressor, and is switched between an ON state and an OFF state. In the refrigerant cooling circuit 70, a bypass flow path 79 connecting a branching portion 71a located between the gas-liquid separation device 4 and the refrigerant cooling circuit 72 and a merging portion 71b located between the refrigerant cooling circuit 72 and the second heater core 76 is provided so as to bypass the refrigerant cooling circuit 72. A refrigerant cooling circuit 77 is provided in the bypass flow path 79.

The refrigerant cooling circuit 77 is a shut-off valve, and is switchable between an OPEN state and a CLOSE state. When the refrigerant cooling circuit 77 is brought into the CLOSE state and the refrigerant cooling circuit 72 is operated (ON), heat pump control is performed, and the first refrigerant discharged from the refrigerant cooling circuit 72 flows to the second heater core 76, the condenser 73, the third expansion valve 75, and the gas-liquid separation device 4.

On the other hand, when the refrigerant cooling circuit 77 is brought into the OPEN state and the refrigerant cooling circuit 72 is brought into the OFF state, heat pipe control is performed, and the first refrigerant bypasses the refrigerant cooling circuit 72 and flows to the refrigerant cooling circuit 77 (bypass flow path 79), the second heater core 76, the condenser 73, the third expansion valve 75, and the gas-liquid separation device 4.

In the gas-liquid separation device 4, the first refrigerant flowing through the PU cooling circuit 10 is separated into the gas and the liquid. A boiling point of the first refrigerant is preferably within an appropriate temperature range of the battery 15. After dividing the first refrigerant into the gas and the liquid, the gas-liquid separation device 4 supplies only the gaseous first refrigerant to the refrigerant cooling circuit 70, and returns the liquid first refrigerant to the PU cooling circuit 10. The gaseous first refrigerant discharged from the third expansion valve 75 of the refrigerant cooling circuit 70 is also supplied to the gas-liquid separation device 4. Therefore, the gaseous first refrigerant from the PU cooling circuit 10 and the gaseous first refrigerant in the refrigerant cooling circuit 70 are supplied to the refrigerant cooling circuit 72, and thus a density of the gaseous first refrigerant supplied to the refrigerant cooling circuit 72 increases, and a flow rate of the gaseous first refrigerant compressed by the refrigerant cooling circuit 72 increases. Accordingly, heating efficiency in the second heater core 76 is improved, and the heating can be appropriately performed even at a low temperature. On the other hand, the gaseous first refrigerant does not have a heat absorption effect, and thus only the liquid first refrigerant having a high heat absorption effect is circulated in the PU cooling circuit 10.

The A/C circuit 50 includes a cooling flow path 58 and a heating flow path 59. In the cooling flow path 58, an outdoor unit 51, a first expansion valve 53, the evaporator 54, a compressor 55, the first heater core 56 (H/C2), an A/C circuit 63, and a second shut-off valve 62 are arranged in this order. In the heating flow path 59, the outdoor unit 51, a first shut-off valve 61, the compressor 55, the first heater core 56, the A/C circuit 63, the chiller 2, and a second expansion valve 57 are arranged in this order. The cooling flow path 58 and the heating flow path 59 have some flow paths and devices in common, and the cooling flow path 58 and the heating flow path 59 are switched by switching the first shut-off valve 61 and the second shut-off valve 62.

The first shut-off valve 61 and the second shut-off valve 62 are both shut-off valves, and are both switchable between an OPEN state and a CLOSE state. The first shut-off valve 61 and the second shut-off valve 62 are controlled such that the the first shut-off valve 61 is in the CLOSE state and the second shut-off valve 62 is in the OPEN state during cooling, and the first shut-off valve 61 is in the OPEN state and the second shut-off valve 62 is in the CLOSE state during heating. The compressor 55 is controlled to operate during cooling and heating, and not to operate during non-operation.

A first connecting portion 64a between the A/C circuit 63 and the second shut-off valve 62 of the cooling flow path 58 and a second connecting portion 64*b* between the chiller 2 and the second expansion valve 57 of the heating flow path 59 are connected by a connecting flow path 65.

The A/C circuit 63 is a three-way valve and is switchable between a H/E bypass ON state and a H/E bypass OFF state. In the H/E bypass ON state, the second refrigerant flows from the first heater core 56 to the first connecting portion 64*a* via the A/C circuit 63. When the second shut-off valve 62 is in the OPEN state, the second refrigerant flows to the outdoor unit 51 via the second shut-off valve 62, and when the second shut-off valve 62 is in the CLOSE state, the second refrigerant flows to the outdoor unit 51 via the second expansion valve 57.

On the other hand, in the H/E bypass OFF state, the second refrigerant flows from the first heater core 56 to the chiller 2 via the A/C circuit 63. In the chiller 2, the heat exchange is performed between the first refrigerant flowing through the PU cooling circuit 10 and the second refrigerant flowing through the A/C circuit 50. When the second shut-off valve 62 is in the OPEN state, the second refrigerant flows to the outdoor unit 51 via the second shut-off valve 62, and when the second shut-off valve 62 is in the CLOSE state, the second refrigerant flows to the outdoor unit 51 via the second expansion valve 57.

The outdoor unit 51 is disposed in the vicinity of the condenser 73, and can heat the second refrigerant flowing through the A/C circuit 50 using waste heat from the condenser 73.

The A/C circuit 50 is provided with a thermometer Ta for detecting a temperature ($T_{A/C}$) of the second refrigerant, between the first heater core 56 and the A/C circuit 63. The PU cooling circuit 10 is provided with a thermometer Tb for detecting a temperature ($T_{IPU}$) of the battery 15 and a pressure gauge P for detecting a pressure ($P_{IPU}$) of the first refrigerant.

Next, an operation state of the temperature control system 1 configured as described above will be described with reference to FIGS. 2 to 9. It should be noted that in FIG. 2 and the subsequent drawings, a flow path in which a refrigerant is not actively flowing by a pump or the like is omitted. A flow of the second refrigerant in the A/C circuit 50 is indicated by a thin solid line, a flow of the first refrigerant in the refrigerant cooling circuit 70 is indicated by a thick solid line, and a flow of the first refrigerant in the PU cooling circuit 10 is indicated by a solid line with an intermediate thickness.

Figure 2:
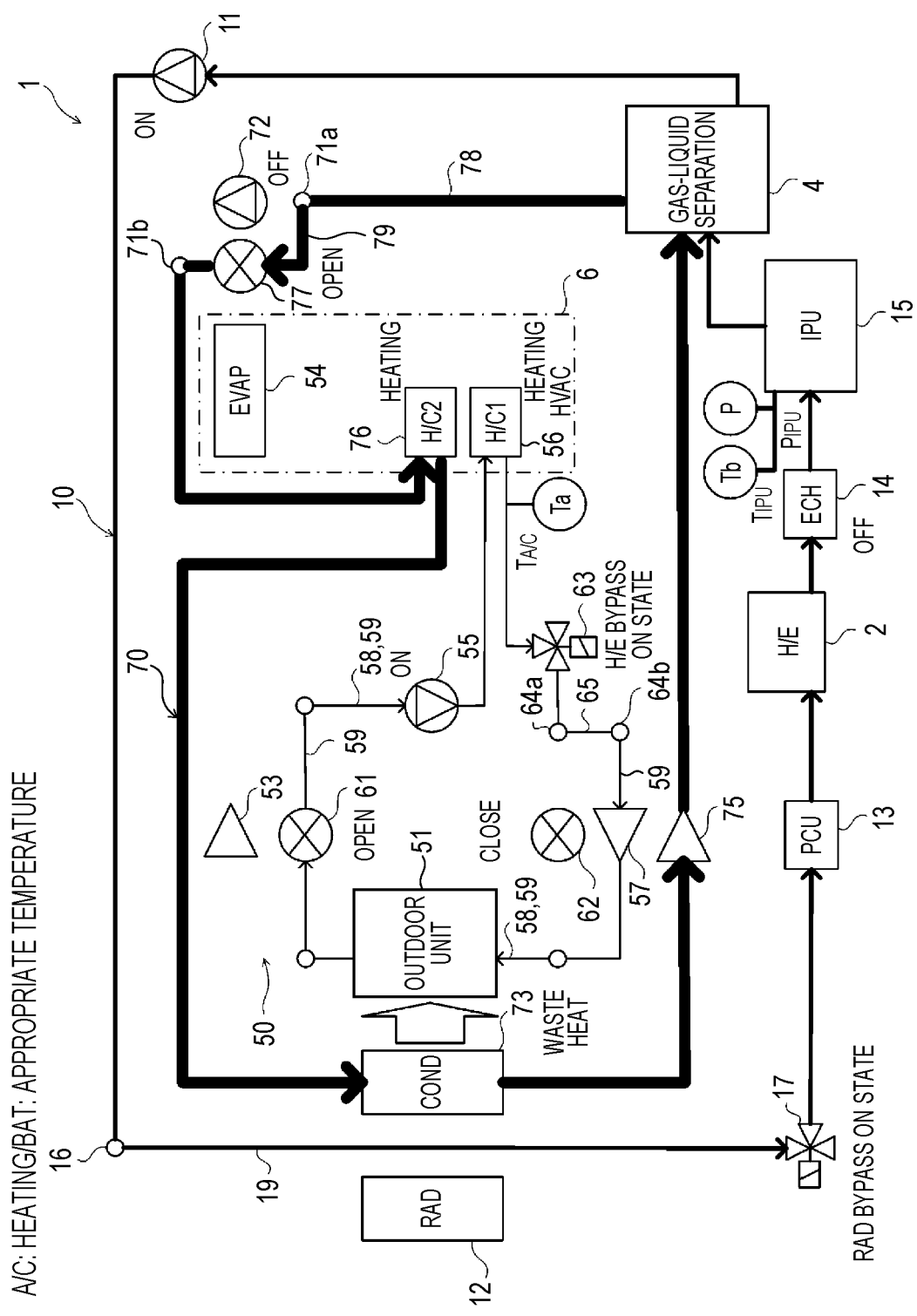
FIG. 2 is a diagram showing a refrigerant flow in the temperature control system 1 when an air conditioner (A/C) is heating and a battery (BAT) is at an appropriate temperature.

FIG. 2 is a diagram showing a refrigerant flow in the temperature control system 1 when an air conditioner (A/C) is heating and a battery (BAT) is at an appropriate temperature.

When the air conditioner (A/C) is heating and the battery (BAT) is at an appropriate temperature, in the A/C circuit 50, the first shut-off valve 61 is in the OPEN state and the second shut-off valve 62 is in the CLOSE state, and the compressor 55 is operated (ON). Accordingly, the second refrigerant circulates through the heating flow path 59, and warm air is discharged from the first heater core 56 into the vehicle interior. At this time, the A/C circuit 63 is controlled to be the H/E bypass ON state, and the second refrigerant does not flow through the chiller 2. Therefore, the heat exchange between the second refrigerant in the A/C circuit 50 and the liquid first refrigerant in the PU cooling circuit 10 is not performed in the chiller 2.

In the PU cooling circuit 10, by bringing the ECH 14 into the OFF state and bringing the PU cooling circuit 17 into the RAD bypass ON state, the PU cooling circuit 11 is operated (ON). Accordingly, the first refrigerant discharged from the PU cooling circuit 11 bypasses the radiator 12, and circulates through the bypass flow path 19, the PU cooling circuit 17, the PCU 13, the chiller 2, the ECH 14, the battery 15, and the gas-liquid separation device 4. Heat of the first refrigerant flowing through the PU cooling circuit 10 is transferred not to the radiator 12 but to the refrigerant cooling circuit 70 by the gas-liquid separation device 4.

In the refrigerant cooling circuit 70, by bringing the refrigerant cooling circuit 72 into the OFF state and bringing the refrigerant cooling circuit 77 into the OPEN state, the first refrigerant circulates through the gas-liquid separation device 4, the refrigerant cooling circuit 77 (bypass flow path 79), the second heater core 76, the condenser 73, and the third expansion valve 75, and warm air is also discharged from the second heater core 76 into the vehicle interior.

As described above, the heat transferred from the PU cooling circuit 10 to the refrigerant cooling circuit 70 by the gas-liquid separation device 4 is used for heating by the second heater core 76. That is, waste heat of the PCU 13 of the refrigerant cooling circuit 70 is used for heating without being discharged by the radiator 12. The waste heat in the condenser 73 of the refrigerant cooling circuit 70 is taken in by the outdoor unit 51 of the A/C circuit 50 disposed in the vicinity of the condenser 73, and is used for heating by the first heater core 56, and thus the heating efficiency can be improved.

Figure 3:
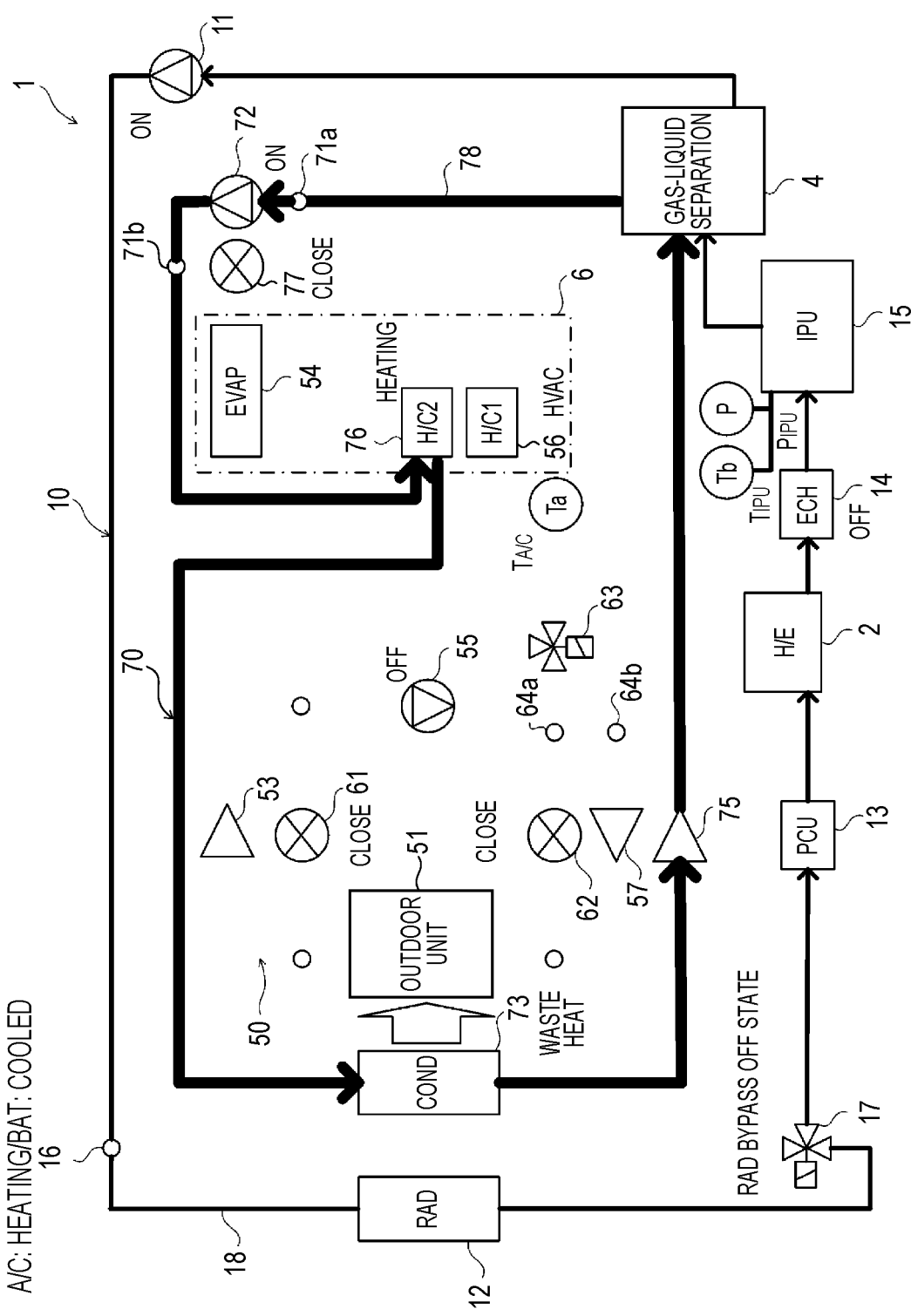
FIG. 3 is a diagram showing a refrigerant flow in the temperature control system 1 when the air conditioner (A/C) is heating and the battery (BAT) is cooled.

FIG. 3 is a diagram showing a refrigerant flow in the temperature control system 1 when the air conditioner (A/C) is heating and the battery (BAT) is cooled.

When the air conditioner (A/C) is heating and the battery (BAT) is cooled, in the A/C circuit 50, the first shut-off valve 61 is in the CLOSE state and the second shut-off valve 62 is in the CLOSE state, and the compressor 55 is not operated (OFF). Accordingly, the second refrigerant does not flow through the A/C circuit 50 even when the heating of the air conditioner (A/C) is in an ON state. In this example, a case is shown in which the A/C circuit 50 is not used, but the A/C circuit 50 may be used in combination to generate warm air from the first heater core 56, as shown in FIG. 2.

In the PU cooling circuit 10, by bringing the ECH 14 into the OFF state and bringing the PU cooling circuit 17 into the RAD bypass OFF state, the PU cooling circuit 11 is operated (ON). Accordingly, the first refrigerant discharged from the PU cooling circuit 11 circulates through the radiator 12, the PU cooling circuit 17, the PCU 13, the chiller 2, the ECH 14, the battery 15, and the gas-liquid separation device 4. The heat of the first refrigerant flowing through the PU cooling circuit 10 is discharged to the atmosphere by the radiator 12 and transferred to the refrigerant cooling circuit 70 by the gas-liquid separation device 4.

In the refrigerant cooling circuit 70, by bringing the refrigerant cooling circuit 72 into the ON state and bringing the refrigerant cooling circuit 77 into the CLOSE state, the heat pump control is performed. The first refrigerant discharged from the refrigerant cooling circuit 72 circulates through the second heater core 76, the condenser 73, the third expansion valve 75, and the gas-liquid separation device 4. At this time, the first refrigerant is compressed by the refrigerant cooling circuit 72 to form a high-pressure gas, and the warm air is discharged from the second heater core 76 into the vehicle interior.

As described above, since the compressor 55 of the A/C circuit 50 does not operate, power consumption can be reduced. By separating the gaseous first refrigerant by the gas-liquid separation device 4, the battery 15 can be efficiently cooled, and the battery 15 can be used at a high efficiency point.

Figure 4:
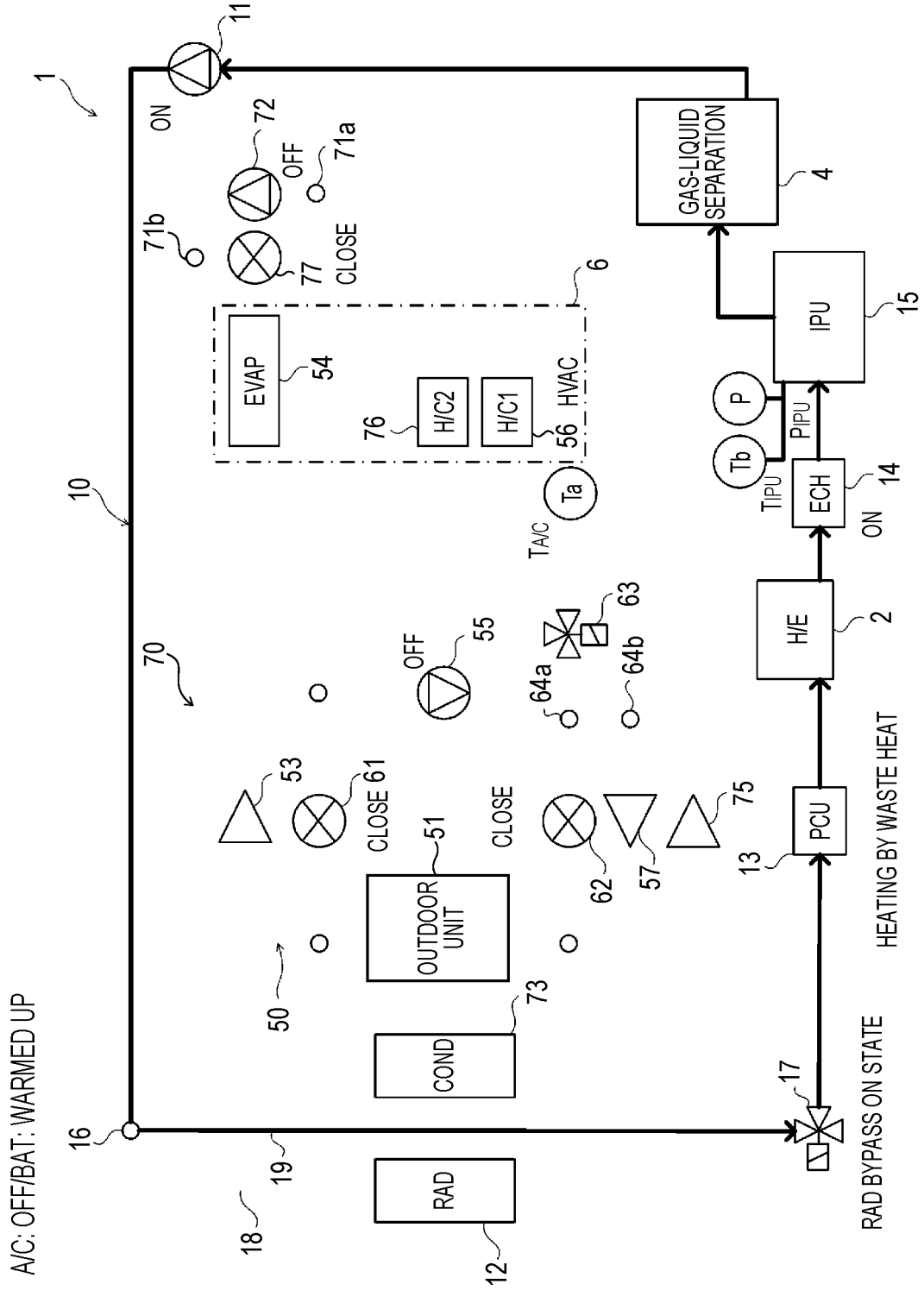
FIG. 4 is a diagram showing a refrigerant flow in the temperature control system 1 when the air conditioner (A/C) is not operating and the battery (BAT) is warmed up.

FIG. 4 is a diagram showing a refrigerant flow in the temperature control system 1 when the air conditioner (A/C) is not operating (OFF) and the battery (BAT) is warmed up.

When the air conditioner (A/C) is not operating (OFF) and the battery (BAT) is warmed up, in the A/C circuit 50, the first shut-off valve 61 is in the CLOSE state and the second shut-off valve 62 is in the CLOSE state, and the compressor 55 is not operated (OFF).

In the PU cooling circuit 10, by bringing the ECH 14 into the ON state and bringing the PU cooling circuit 17 into the RAD bypass ON state, the PU cooling circuit 11 is operated (ON). Accordingly, the first refrigerant discharged from the PU cooling circuit 11 bypasses the radiator 12, and circulates through the bypass flow path 19, the PU cooling circuit 17, the PCU 13, the chiller 2, the ECH 14, the battery 15, and the gas-liquid separation device 4. The first refrigerant flowing through the PU cooling circuit 10 is warmed by the waste heat of the PCU 13 and heat of the ECH 14, and heats the battery 15.

In the refrigerant cooling circuit 70, by bringing the refrigerant cooling circuit 72 into the OFF state and bringing the refrigerant cooling circuit 77 into the CLOSE state, the first refrigerant does not flow.

Figure 5:
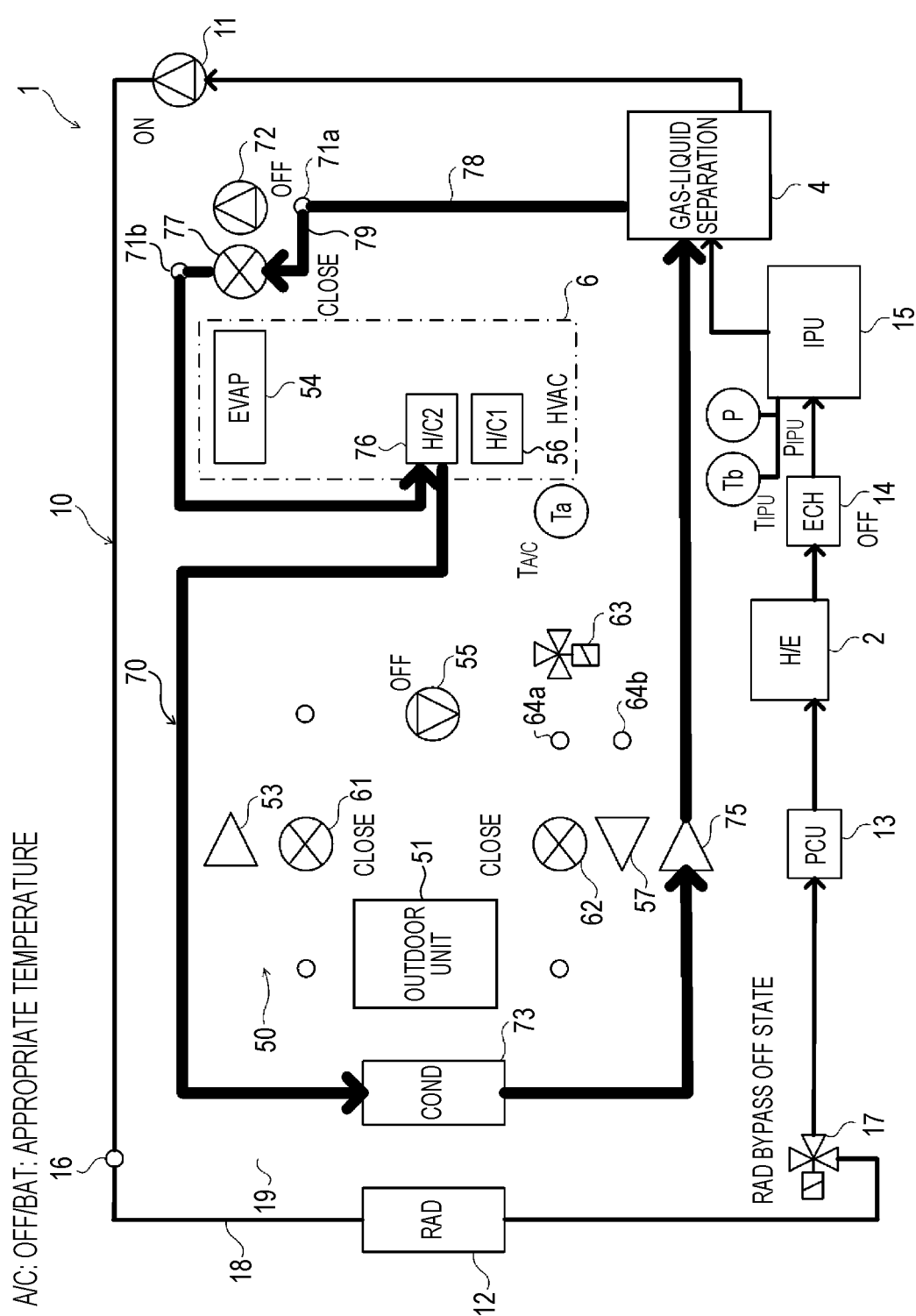
FIG. 5 is a diagram showing a refrigerant flow in the temperature control system 1 when the air conditioner (A/C) is not operating and the battery (BAT) is at an appropriate temperature.

FIG. 5 is a diagram showing a refrigerant flow in the temperature control system 1 when the air conditioner (A/C) is not operating (OFF) and the battery (BAT) is at an appropriate temperature.

When the air conditioner (A/C) is not operating (OFF) and the battery (BAT) is at an appropriate temperature, in the A/C circuit 50, the first shut-off valve 61 is in the CLOSE state and the second shut-off valve 62 is in the CLOSE state, and the compressor 55 is not operated.

In the PU cooling circuit 10, by bringing the ECH 14 into the OFF state and bringing the PU cooling circuit 17 into the RAD bypass OFF state, the PU cooling circuit 11 is operated (ON). Accordingly, the first refrigerant discharged from the PU cooling circuit 11 circulates through the radiator 12, the PU cooling circuit 17, the PCU 13, the chiller 2, the ECH 14, the battery 15, and the gas-liquid separation device 4. The heat of the first refrigerant flowing through the PU cooling circuit 10 is discharged to the atmosphere by the radiator 12.

In the refrigerant cooling circuit 70, by bringing the refrigerant cooling circuit 72 into the OFF state and bringing the refrigerant cooling circuit 77 into the OPEN state, the first refrigerant circulates through the gas-liquid separation device 4, the refrigerant cooling circuit 77 (bypass flow path 79), the second heater core 76, the condenser 73, and the third expansion valve 75. Since the first refrigerant flowing through the refrigerant cooling circuit 70 radiates heat by the heat pipe control, no power is consumed in the refrigerant cooling circuit 70.

Figure 6:
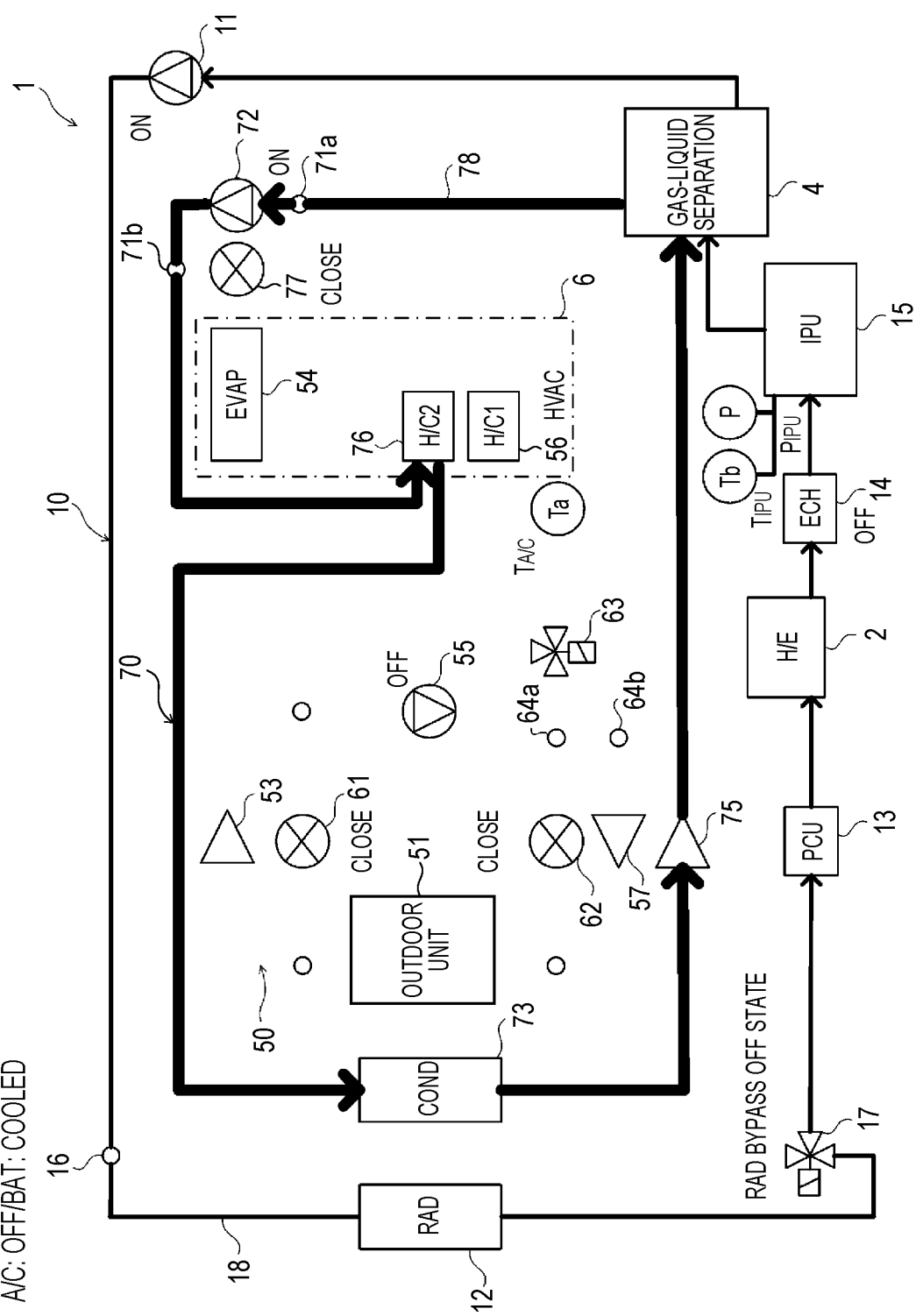
FIG. 6 is a diagram showing a refrigerant flow in the temperature control system 1 when the air conditioner (A/C) is not operating and the battery (BAT) is cooled.

FIG. 6 is a diagram showing a refrigerant flow in the temperature control system 1 when the air conditioner (A/C) is not operating (OFF) and the battery (BAT) is cooled.

When the air conditioner (A/C) is not operating (OFF) and the battery (BAT) is cooled, in the A/C circuit 50, the first shut-off valve 61 is in the CLOSE state and the second shut-off valve 62 is in the CLOSE state, and the compressor 55 is not operated.

In the PU cooling circuit 10, by bringing the ECH 14 into the OFF state and bringing the PU cooling circuit 17 into the RAD bypass OFF state, the PU cooling circuit 11 is operated (ON). Accordingly, the first refrigerant discharged from the PU cooling circuit 11 circulates through the radiator 12, the PU cooling circuit 17, the PCU 13, the chiller 2, the ECH 14, the battery 15, and the gas-liquid separation device 4. The heat of the first refrigerant flowing through the PU cooling circuit 10 is discharged to the atmosphere by the radiator 12 and transferred to the refrigerant cooling circuit 70 by the gas-liquid separation device 4.

In the refrigerant cooling circuit 70, by bringing the refrigerant cooling circuit 72 into the ON state and bringing the refrigerant cooling circuit 77 into the CLOSE state, the heat pump control is performed in the refrigerant cooling circuit 70. The first refrigerant discharged from the refrigerant cooling circuit 72 circulates through the second heater core 76, the condenser 73, the third expansion valve 75, and the gas-liquid separation device 4. At this time, the first refrigerant is cooled by the gas-liquid separation device 4. Therefore, the battery 15 is cooled by the first refrigerant flowing through the PU cooling circuit 10. Accordingly, power consumption is generated due to an operation of the refrigerant cooling circuit 72, but the battery 15 can be efficiently cooled, and the battery 15 can be used at a high efficiency point. By operating the refrigerant cooling circuit 72 of the refrigerant cooling circuit 70 at the time of charging in which traveling wind cannot be ensured, cooling performance can be ensured by increasing a difference from an outside air temperature, and a charging time can be shortened.

Figure 7:
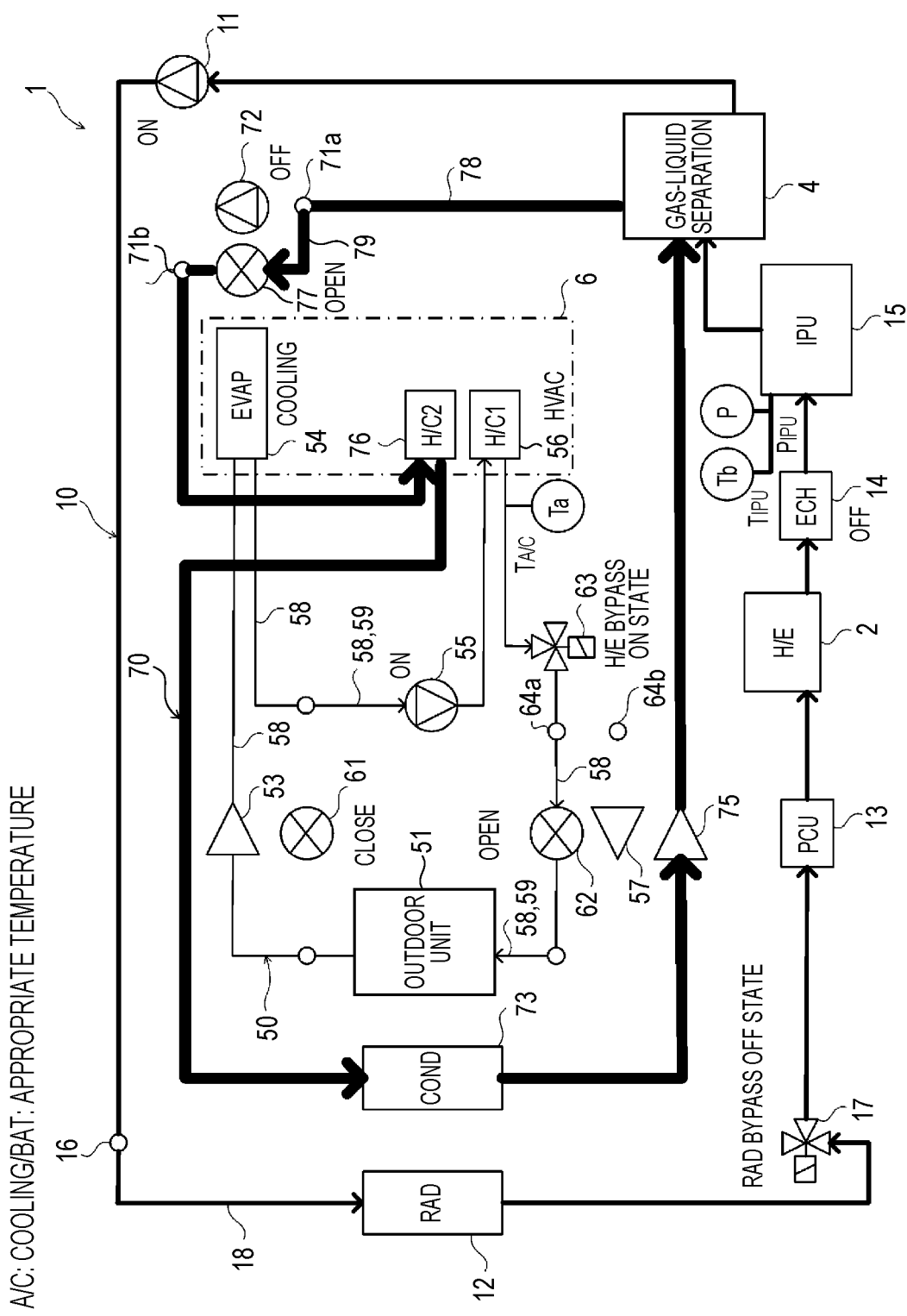
FIG. 7 is a diagram showing a refrigerant flow in the temperature control system 1 when the air conditioner (A/C) is cooling and the battery (BAT) is at an appropriate temperature.

FIG. 7 is a diagram showing a refrigerant flow in the temperature control system 1 when the air conditioner (A/C) is cooling and the battery (BAT) is at an appropriate temperature.

When the air conditioner (A/C) is cooling and the battery (BAT) is at an appropriate temperature, in the A/C circuit 50, the first shut-off valve 61 is in the CLOSE state and the second shut-off valve 62 is in the OPEN state, and the compressor 55 is operated (ON). Accordingly, the second refrigerant circulates in the cooling flow path 58, and cold air is discharged from the evaporator 54 into the vehicle interior. At this time, the A/C circuit 63 is controlled to be the H/E bypass ON state, and the second refrigerant does not flow through the chiller 2. Therefore, the heat exchange between the second refrigerant in the A/C circuit 50 and the liquid first refrigerant in the PU cooling circuit 10 is not performed in the chiller 2.

In the PU cooling circuit 10, by bringing the ECH 14 into the OFF state and bringing the PU cooling circuit 17 into the RAD bypass OFF state, the PU cooling circuit 11 is operated (ON). Accordingly, the liquid first refrigerant discharged from the PU cooling circuit 11 circulates through the radiator 12, the PU cooling circuit 17, the PCU 13, the chiller 2, the ECH 14, the battery 15, and the gas-liquid separation device 4. The heat of the liquid first refrigerant flowing through the PU cooling circuit 10 is discharged to the atmosphere by the radiator 12.

In the refrigerant cooling circuit 70, by bringing the refrigerant cooling circuit 72 into the OFF state and bringing the refrigerant cooling circuit 77 into the OPEN state, the first refrigerant circulates through the gas-liquid separation device 4, the refrigerant cooling circuit 77 (bypass flow path 79), the second heater core 76, the condenser 73, and the third expansion valve 75. Since the first refrigerant flowing through the refrigerant cooling circuit 70 radiates heat by the heat pipe control, no power is consumed in the refrigerant cooling circuit 70.

Figure 8:
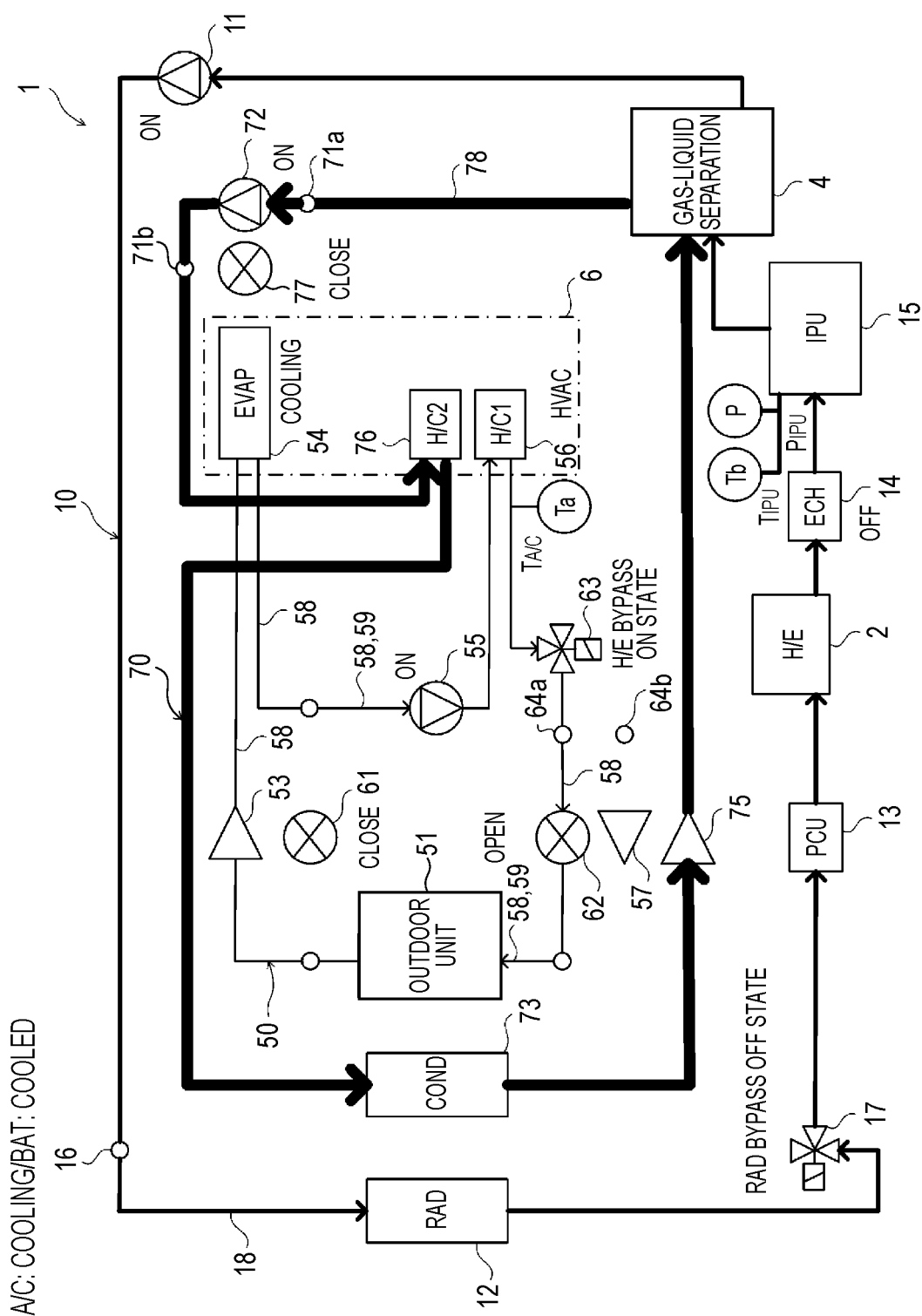
FIG. 8 is a diagram showing a refrigerant flow in the temperature control system 1 when the air conditioner (A/C) is cooling and the battery (BAT) is cooled.

FIG. 8 is a diagram showing a refrigerant flow in the temperature control system 1 when the air conditioner (A/C) is cooling and the battery (BAT) is cooled.

When the air conditioner (A/C) is cooling and the battery (BAT) is cooled, in the A/C circuit 50, the first shut-off valve 61 is in the CLOSE state and the second shut-off valve 62 is in the OPEN state, and the compressor 55 is operated (ON). Accordingly, the second refrigerant circulates in the cooling flow path 58, and cold air is discharged from the evaporator 54 into the vehicle interior. At this time, the A/C circuit 63 is controlled to be the H/E bypass ON state, and the second refrigerant does not flow through the chiller 2. Therefore, the heat exchange between the second refrigerant in the A/C circuit 50 and the liquid first refrigerant in the PU cooling circuit 10 is not performed in the chiller 2.

In the PU cooling circuit 10, by bringing the ECH 14 into the OFF state and bringing the PU cooling circuit 17 into the RAD bypass OFF state, the PU cooling circuit 11 is operated (ON). Accordingly, the first refrigerant discharged from the PU cooling circuit 11 circulates through the radiator 12, the PU cooling circuit 17, the PCU 13, the chiller 2, the ECH 14, the battery 15, and the gas-liquid separation device 4. The heat of the liquid first refrigerant flowing through the PU cooling circuit 10 is discharged to the atmosphere by the radiator 12 and transferred to the refrigerant cooling circuit 70 by the gas-liquid separation device 4.

In the refrigerant cooling circuit 70, by bringing the refrigerant cooling circuit 72 into the ON state and bringing the refrigerant cooling circuit 77 into the CLOSE state, the heat pump control is performed in the refrigerant cooling circuit 70. The first refrigerant discharged from the refrigerant cooling circuit 72 circulates through the second heater core 76, the condenser 73, the third expansion valve 75, and the gas-liquid separation device 4. At this time, the first refrigerant is cooled by the gas-liquid separation device 4. Therefore, the battery 15 is cooled by the first refrigerant flowing through the PU cooling circuit 10. Accordingly, power consumption is generated due to an operation of the refrigerant cooling circuit 72, but the battery 15 can be efficiently cooled, and the battery 15 can be used at a high efficiency point.

Figure 9:
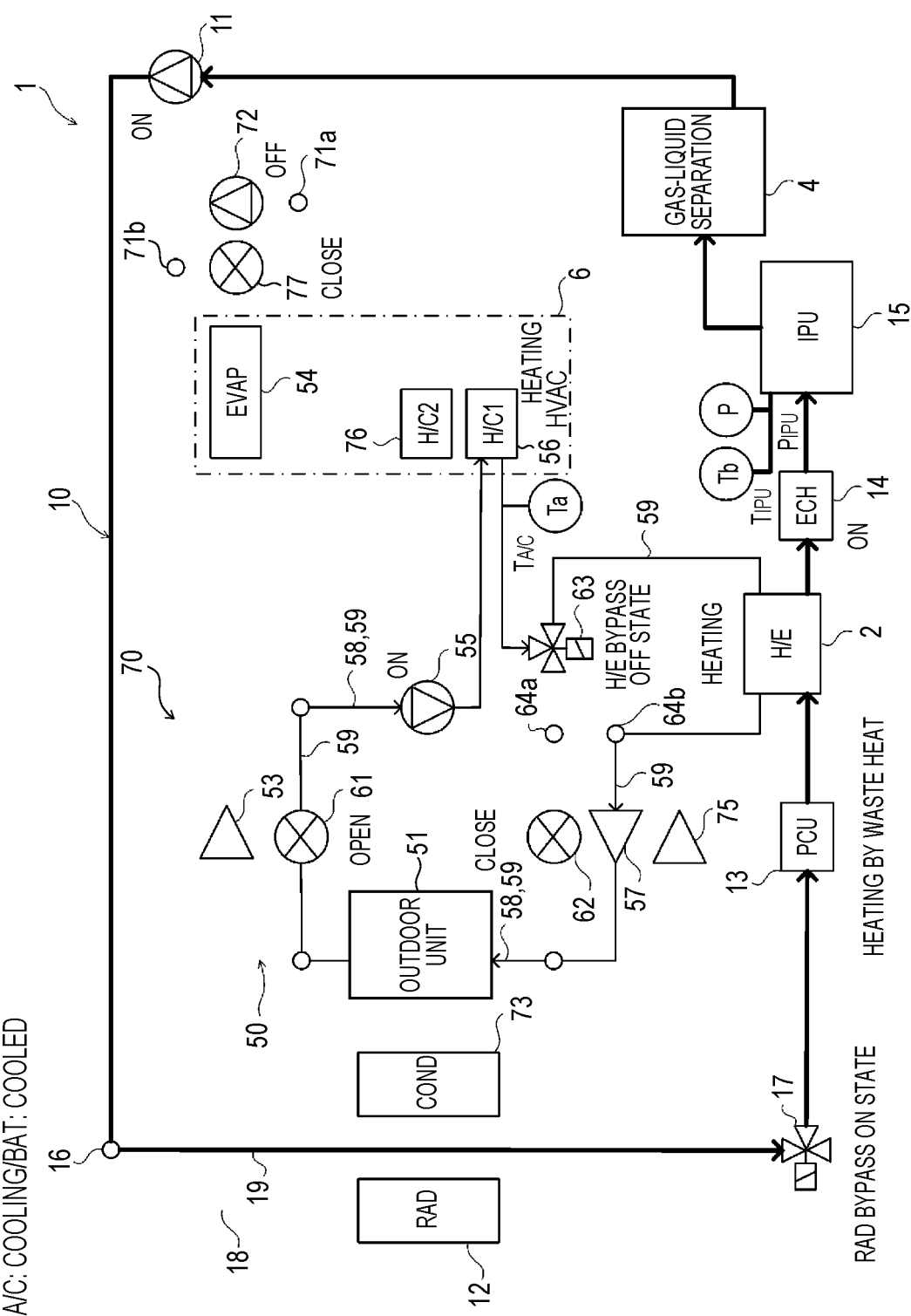
FIG. 9 is a diagram showing a refrigerant flow in the temperature control system 1 when the air conditioner (A/C) is heating and the battery (BAT) is warmed up.

FIG. 9 is a diagram showing a refrigerant flow in the temperature control system 1 when the air conditioner (A/C) is heating and the battery (BAT) is warmed up.

When the air conditioner (A/C) is heating and the battery (BAT) is warmed up, in the A/C circuit 50, the first shut-off valve 61 is in the OPEN state and the second shut-off valve 62 is in the CLOSE state, and the compressor 55 is operated (ON). Accordingly, the second refrigerant circulates through the heating flow path 59, and warm air is discharged from the first heater core 56 into the vehicle interior. At this time, when a temperature of the second refrigerant is higher than a predetermined temperature (lower limit temperature ($T_1$) of the appropriate temperature range of the battery 15 to be described later), the A/C circuit 63 is controlled to be the H/E bypass OFF state, the second refrigerant flows through the chiller 2, the heat exchange between the second refrigerant in the A/C circuit 50 and the first refrigerant in the PU cooling circuit 10 is performed in the chiller 2, and the first refrigerant is warmed. Although not shown, when the temperature of the second refrigerant is lower than the predetermined temperature, the A/C circuit 63 is controlled to be the H/E bypass ON state, and the second refrigerant bypasses the chiller 2.

In the PU cooling circuit 10, by bringing the ECH 14 into the ON state and bringing the PU cooling circuit 17 into the RAD bypass ON state, the PU cooling circuit 11 is operated (ON). Accordingly, the liquid first refrigerant discharged from the PU cooling circuit 11 bypasses the radiator 12, and circulates through the bypass flow path 19, the PU cooling circuit 17, the PCU 13, the chiller 2, the ECH 14, the battery 15, and the gas-liquid separation device 4. The first refrigerant flowing through the PU cooling circuit 10 is warmed by the waste heat of the PCU 13, heat received by the chiller 2, and the heat of the ECH 14, and heats the battery 15.

In the refrigerant cooling circuit 70, by bringing the refrigerant cooling circuit 72 into the OFF state and bringing the refrigerant cooling circuit 77 into the CLOSE state, the gaseous first refrigerant does not flow.

As described above, the first refrigerant can be heated by the waste heat of the PCU 13, the heat received by the chiller 2, and the heat of the ECH 14, and thus the power consumption can be reduced by shortening an operating time of the ECH 14.

Figure 10:
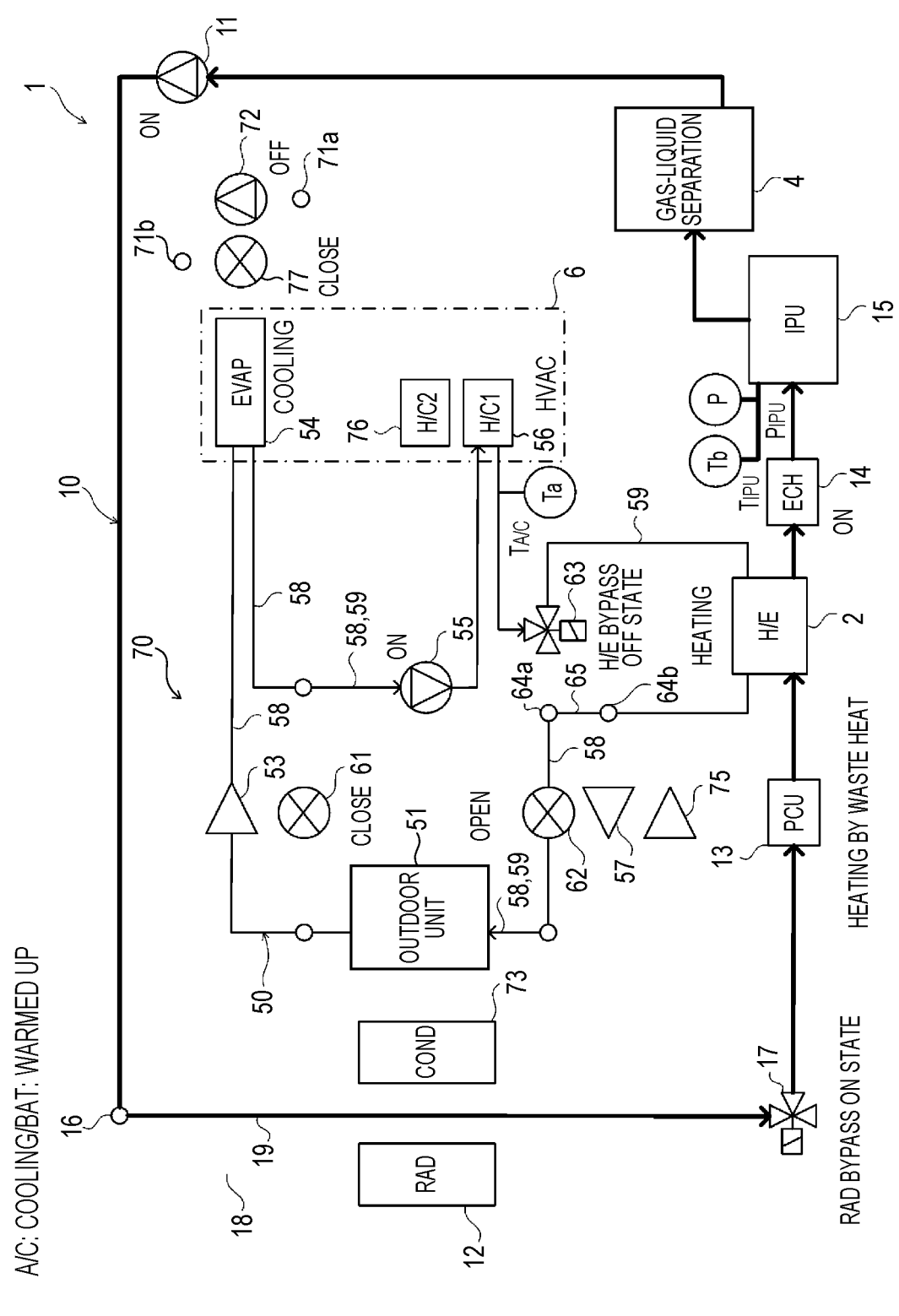
FIG. 10 is a diagram showing a refrigerant flow in the temperature control system 1 when the air conditioner (A/C) is cooling and the battery (BAT) is warmed up.

FIG. 10 is a diagram showing a refrigerant flow in the temperature control system 1 when the air conditioner (A/C) is cooling and the battery (BAT) is warmed up.

When the air conditioner (A/C) is cooling and the battery (BAT) is warmed up, in the A/C circuit 50, the first shut-off valve 61 is in the CLOSE state and the second shut-off valve 62 is in the OPEN state, and the compressor 55 is operated (ON). Accordingly, the second refrigerant circulates in the cooling flow path 58, and cold air is discharged from the evaporator 54 into the vehicle interior. At this time, when a temperature of the second refrigerant is higher than a predetermined temperature (lower limit temperature ($T_1$) of the appropriate temperature range of the battery 15 to be described later), the A/C circuit 63 is controlled to be the H/E bypass OFF state, the second refrigerant flows through the chiller 2, the heat exchange between the second refrigerant in the A/C circuit 50 and the first refrigerant in the PU cooling circuit 10 is performed in the chiller 2, and the first refrigerant is warmed. Although not shown, when the temperature of the second refrigerant is lower than the predetermined temperature, the A/C circuit 63 is controlled to be the H/E bypass ON state, and the second refrigerant bypasses the chiller 2.

In the PU cooling circuit 10, by bringing the ECH 14 into the ON state and bringing the PU cooling circuit 17 into the RAD bypass ON state, the PU cooling circuit 11 is operated (ON). Accordingly, the first refrigerant discharged from the PU cooling circuit 11 bypasses the radiator 12, and circulates through the bypass flow path 19, the PU cooling circuit 17, the PCU 13, the chiller 2, the ECH 14, the battery 15, and the gas-liquid separation device 4. The first refrigerant flowing through the PU cooling circuit 10 is heated by the waste heat of the PCU 13, the heat received by the chiller 2, and the heat of the ECH 14, and heats the battery 15.

In the refrigerant cooling circuit 70, by bringing the refrigerant cooling circuit 72 into the OFF state and bringing the refrigerant cooling circuit 77 into the CLOSE state, the first refrigerant does not flow.

As described above, the first refrigerant can be heated by the waste heat of the PCU 13, the heat received by the chiller 2, and the heat of the ECH 14, and thus the power consumption can be reduced by shortening an operating time of the ECH 14.

Figure 11:
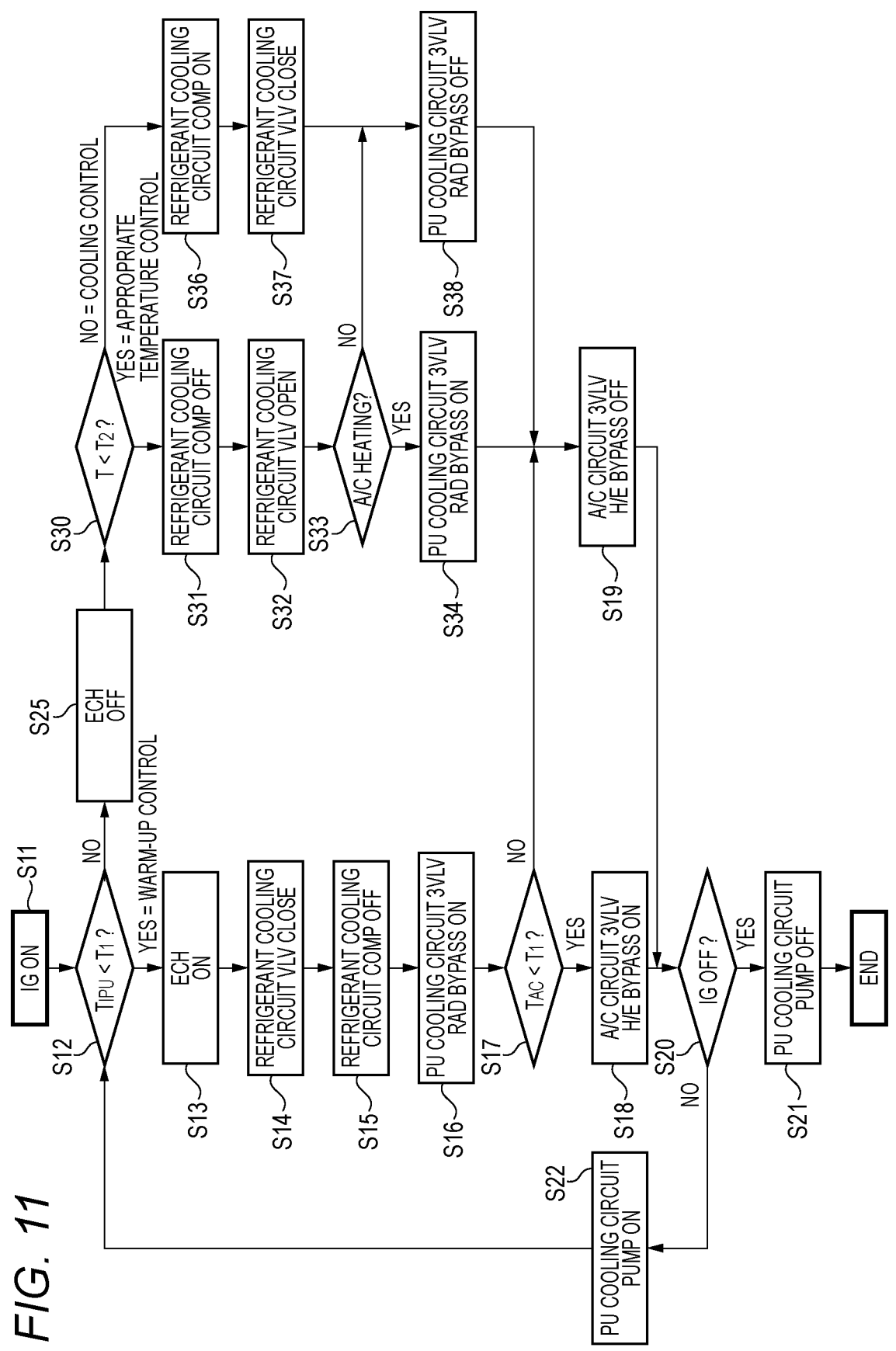
FIG. 11 is a diagram showing a control flow of the temperature control system 1.

Next, a control flow of the temperature control system 1 will be described with reference to FIG. 11. Since cooling, heating, and non-operation of the HVAC 6 are selected by an intention of a passenger or by an air condition control device, control of elements (ECH 14, refrigerant cooling circuit 77, refrigerant cooling circuit 72, PU cooling circuit 17, A/C circuit 63, and PU cooling circuit 11) of the temperature control system 1 will be described below.

When an ignition is in an ON state (S11), first, it is determined whether a temperature ($T_{IPU}$) of the battery 15 is lower than the lower limit temperature ($T_1$) of the appropriate temperature range of the battery 15 (S12). When the temperature ($T_{IPU}$) of the battery 15 is lower than the lower limit temperature ($T_1$) of the appropriate temperature range of the battery 15 (YES in S12), warm-up control for heating the battery 15 is performed. Specifically, the ECH 14 is brought into the ON state (S13), the refrigerant cooling circuit 77 is brought into the CLOSE state (S14), the refrigerant cooling circuit 72 is brought into the OFF state (S15), and the PU cooling circuit 17 is brought into the RAD bypass ON state (S16).

Subsequently, it is determined whether a temperature ($T_{A/C}$) of the second refrigerant is lower than the lower limit temperature ($T_1$) of the appropriate temperature range of the battery 15 (S17). When the temperature ($T_{A/C}$) of the second refrigerant is lower than the lower limit temperature ($T_1$) of the appropriate temperature range of the battery 15 (YES in S17), the A/C circuit 63 is brought into the H/E bypass ON state (S18), and when the temperature ($T_{A/C}$) of the second refrigerant is higher than the lower limit temperature ($T_1$) of the appropriate temperature range of the battery 15 (NO in S17), the A/C circuit 63 is brought into the H/E bypass OFF state (S19).

Then, it is determined whether the ignition is in an OFF state (S20), and when the ignition is in the OFF state (YES in S20), the refrigerant cooling circuit 72 is brought into the OFF state (S21), and the process ends. On the other hand, when the ignition is in the ON state (NO in S20), the PU cooling circuit 11 is brought into the ON state (S22), and the process returns to step S12.

When the temperature ($T_{IPU}$) of the battery 15 is higher than the lower limit temperature ($T_1$) of the appropriate temperature range of the battery 15 (NO in S12), the ECH 14 is brought into the OFF state (S25), and subsequently, it is determined whether the temperature ($T_{IPU}$) of the battery 15 is lower than an upper limit temperature ($T_2$) of the appropriate temperature range of the battery 15 (S30). When the temperature ($T_{IPU}$) of the battery 15 is lower than the upper limit temperature ($T_2$) of the appropriate temperature range of the battery 15 (YES in S30), appropriate temperature control is performed in which the battery 15 is neither heated nor cooled. Specifically, the refrigerant cooling circuit 72 is brought into the OFF state (S31), and the refrigerant cooling circuit 77 is brought into the OPEN state (S32). Then, it is determined whether the air conditioner is heating (S33), and when the air conditioner is heating (YES in S33), the PU cooling circuit 17 is brought into the RAD bypass ON state (S34), and the process proceeds to the above step S19 and subsequent steps.

When the temperature ($T_{IPU}$) of the battery 15 is higher than the upper limit temperature ($T_2$) of the appropriate temperature range of the battery 15 (NO in S30), cooling control for cooling the battery 15 is performed. Specifically, the refrigerant cooling circuit 72 is brought into the ON state (S36), the refrigerant cooling circuit 77 is brought into the CLOSE state (S37), and the PU cooling circuit 17 is brought into the RAD bypass OFF state (S38).

Figure 12:
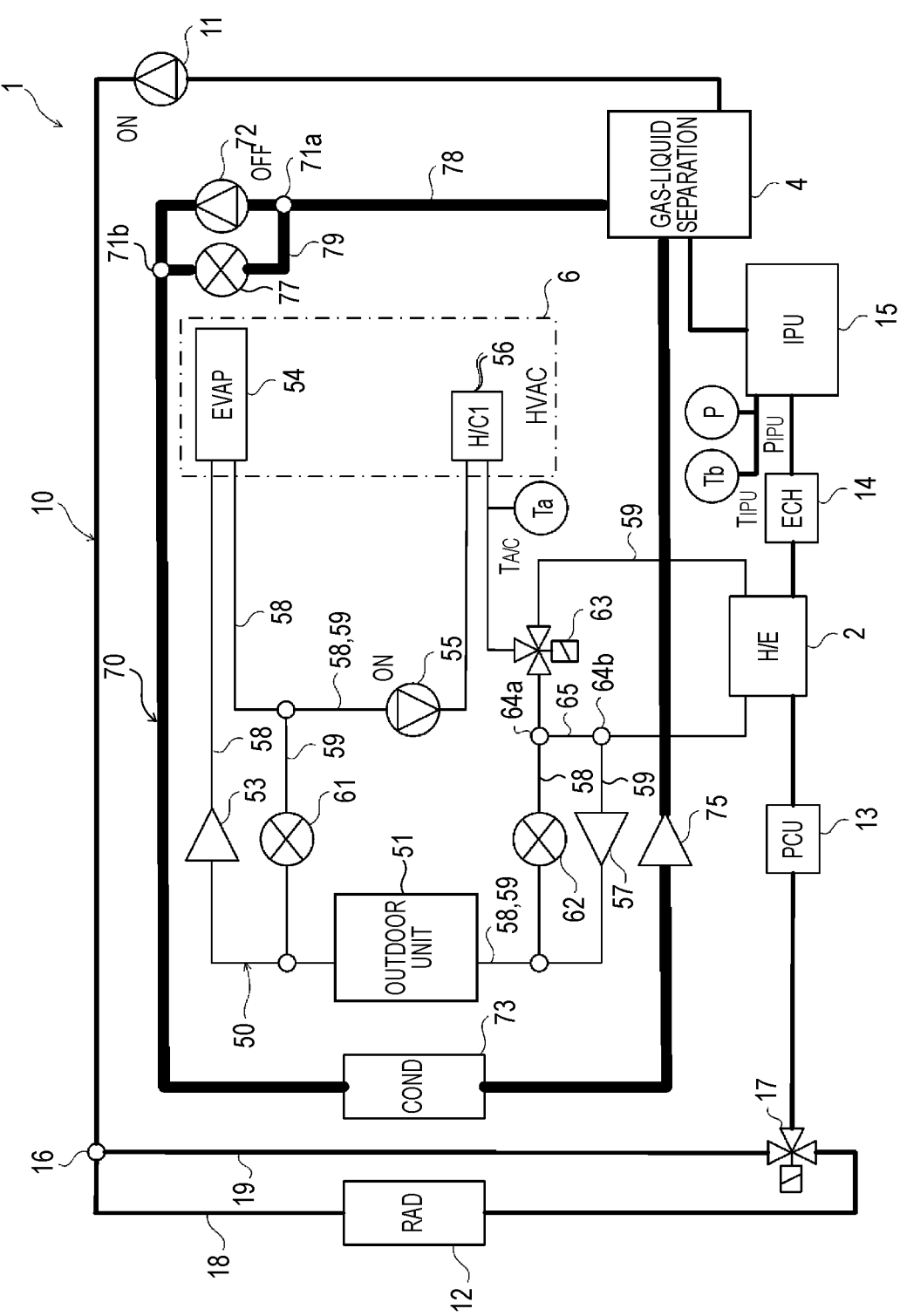
FIG. 12 is a circuit diagram of the temperature control system 1 according to a modification.

FIG. 12 is a circuit diagram of the temperature control system 1 according to a modification.

In the main flow path 78 of the refrigerant cooling circuit 70, the gas-liquid separation device 4, the refrigerant cooling circuit 72, the condenser 73, and the third expansion valve 75 are arranged in this order, and the second heater core 76 (H/C2) is not disposed as in the above embodiment. That is, the HVAC 6 includes only the evaporator 54 and the first heater core 56 (H/C1) of the A/C circuit 50. In this case, the vehicle interior may be heated by the first heater core 56 (H/C1) during heating, and the number of components can be reduced.

Although various embodiments have been described above with reference to the drawings, it is needless to say that the present invention is not limited to the examples. It is apparent that those skilled in the art can conceive of various modifications and changes within the scope described in the claims, and it is understood that such modifications and changes naturally fall within the technical scope of the present invention. In addition, respective constituent elements in the above embodiment may be freely combined without departing from the gist of the invention.

For example, an arrangement order of elements of each circuit may be changed. In the main flow path 18 of the PU cooling circuit 10, the PCU 13, the chiller 2, the ECH 14, and the battery 15 do not necessarily need to be arranged in this order.

In the present description, at least the following matters are described. Although corresponding constituent elements or the like in the above embodiment are shown in parentheses, the present invention is not limited thereto.

(1) A temperature control system (temperature control system 1) mounted on a vehicle, the temperature control system including:
a PU cooling circuit (PU cooling circuit 10) configured to allow a first refrigerant to flow therethrough and adjust a temperature of a power unit (PCU 13, battery 15);
a refrigeration cycle circuit (A/C circuit 50), which is used for air conditioning, configured to allow a second refrigerant to flow therethrough;
a first heat exchanger (chiller 2) configured to exchange heat between the first refrigerant in the PU cooling circuit and the second refrigerant in the refrigeration cycle circuit;
a gas-liquid separation device (gas-liquid separation device 4) configured to separate the first refrigerant into gas and liquid; and
a refrigerant cooling circuit (refrigerant cooling circuit 70) configured to allow the first refrigerant to flow therethrough and communicate with the PU cooling circuit via the gas-liquid separation device.

When an outside air temperature is low, heat received by the second refrigerant from the atmosphere decreases, and a density of the second refrigerant decreases, and thus a flow rate of the second refrigerant, which is compressed to a high temperature by a compressor of the refrigeration cycle circuit, becomes small, and heating performance deteriorates. According to (1), the heat exchanger (outdoor unit) of the refrigeration cycle circuit takes in waste heat which is discharged from the gaseous first refrigerant separated by the gas-liquid separation device to the atmosphere by a condenser of the refrigerant cooling circuit, thereby improving the heating performance. Accordingly, it is possible to achieve both temperature control performance of the power unit and air conditioning performance while reducing an increase in power consumption.

(2) The temperature control system according to (1), in which the refrigeration cycle circuit includes:
a first flow path (first flow path 58) configured to allow the second refrigerant to flow through a second heat exchanger (outdoor unit 51) configured to exchange heat between the second refrigerant and outside air, a first expansion valve (first expansion valve 53), an evaporator (evaporator 54), a first compressor (compressor 55), and a first heater core (first heater core 56) in this order; and
a second flow path (second flow path 59) configured to allow the second refrigerant to flow through the second heat exchanger, the first compressor, the first heater core, the first heat exchanger, and a second expansion valve (second expansion valve 57) in this order, and the first flow path and the second flow path are switchable by a valve device (first shut-off valve 61, second shut-off valve 62).

According to (2), by switching to the first flow path during cooling and switching to the second flow path during heating, a temperature of a vehicle interior can be appropriately adjusted.

(3) The temperature control system according to (2), in which the refrigerant cooling circuit includes:

a refrigerant main flow path (main flow path 78) configured to allow the first refrigerant to flow through the gas-liquid separation device, a second compressor (refrigerant cooling circuit 72), a condenser (condenser 73), and a third expansion valve (third expansion valve 75) in this order; and a refrigerant bypass flow path (bypass flow path 79) configured to bypass the second compressor in the refrigerant main flow path, and the refrigerant main flow path and the refrigerant bypass flow path are switchable by a first valve (refrigerant cooling circuit 77).

According to (3), it is possible to reduce the power consumption by switching between heat pump cooling control and heat pipe cooling control.

(4) The temperature control system according to (3), in which the first flow path passes through a second heater core (second heater core 76) disposed between the second compressor and the condenser.

According to (4), the waste heat of the first refrigerant in a gaseous state that is subjected to gas-liquid separation can be used for heating.

(5) The temperature control system according to (3) or (4), in which the PU cooling circuit includes:

a PU main flow path (main flow path 18) configured to allow the first refrigerant to flow through a battery (battery 15), the gas-liquid separation device, a pump (PU cooling circuit 11), a radiator (radiator 12), a drive unit (PCU 13), the first heat exchanger, and a heater (ECH 14); and a PU bypass flow path (bypass flow path 19) configured to bypass the radiator in the PU main flow path, and the PU main flow path and the PU bypass flow path are switchable by a second valve (PU cooling circuit 17).

According to (5), a temperature of the power unit can be appropriately controlled by shutting off or allowing the flow to the radiator depending on the temperature of the power unit.

What is claimed is:

1. A temperature control system mounted on a vehicle, the temperature control system comprising:

a PU cooling circuit configured to allow a first refrigerant to flow therethrough and adjust a temperature of a power unit;

a refrigeration cycle circuit, which is used for air conditioning, configured to allow a second refrigerant to flow therethrough;

a first heat exchanger configured to exchange heat between the first refrigerant in the PU cooling circuit and the second refrigerant in the refrigeration cycle circuit;

a gas-liquid separation device configured to separate the first refrigerant into gas and liquid; and a refrigerant cooling circuit configured to allow the first refrigerant in a gaseous state to flow therethrough and communicate with the PU cooling circuit via the gas-liquid separation device, wherein a second heat exchanger of the refrigeration cycle circuit is configured to take in waste heat which is discharged from the gaseous first refrigerant separated by the gas-liquid separation device to an atmosphere by a condenser of the refrigerant cooling circuit.

2. The temperature control system according to claim 1, wherein the refrigeration cycle circuit includes:

a first flow path configured to allow the second refrigerant to flow through the second heat exchanger configured to exchange heat between the second refrigerant and outside air, a first expansion valve, an evaporator, a first compressor, and a first heater core in this order; and a second flow path configured to allow the second refrigerant to flow through the second heat exchanger, the first compressor, the first heater core, the first heat exchanger, and a second expansion valve in this order, and the first flow path and the second flow path are switchable by a valve device.

3. The temperature control system according to claim 2, wherein the refrigerant cooling circuit includes:

a refrigerant main flow path configured to allow the first refrigerant to flow through the gas-liquid separation device, a second compressor, the condenser, and a third expansion valve in this order; and a refrigerant bypass flow path configured to bypass the second compressor in the refrigerant main flow path, and the refrigerant main flow path and the refrigerant bypass flow path are switchable by a first valve.

4. The temperature control system according to claim 3, wherein the first flow path passes through a second heater core disposed between the second compressor and the condenser.

5. The temperature control system according to claim 3, wherein the PU cooling circuit includes:

a PU main flow path configured to allow the first refrigerant to flow through a battery, the gas-liquid separation device, a pump, a radiator, a drive unit, the first heat exchanger, and a heater; and a PU bypass flow path configured to bypass the radiator in the PU main flow path, and the PU main flow path and the PU bypass flow path are switchable by a second valve.

\* \* \* \* \*